US009639299B2

(12) United States Patent
Calder et al.

(10) Patent No.: US 9,639,299 B2
(45) Date of Patent: *May 2, 2017

(54) MANAGING VIRTUAL HARD DRIVES AS BLOBS

(71) Applicant: MICROSOFT TECHNOLOGY LICENSING, LLC, Redmond, WA (US)

(72) Inventors: Bradley Gene Calder, Bellevue, WA (US); Andrew James Edwards, Bellevue, WA (US); Ju Wang, Redmond, WA (US); Samer Arafeh, Sammamish, WA (US); Anu Engineer, Redmond, WA (US); Yue Zuo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 343 days.

This patent is subject to a terminal disclaimer.

(21) Appl. No.: 13/944,627

(22) Filed: Jul. 17, 2013

(65) Prior Publication Data

US 2013/0305005 A1 Nov. 14, 2013

Related U.S. Application Data

(63) Continuation of application No. 12/619,307, filed on Nov. 16, 2009, now Pat. No. 8,516,137.

(51) Int. Cl.
*G06F 15/16* (2006.01)
*G06F 3/06* (2006.01)

(52) U.S. Cl.
CPC .......... *G06F 3/0686* (2013.01); *G06F 3/0604* (2013.01); *G06F 3/067* (2013.01);
(Continued)

(58) Field of Classification Search
CPC .................................................. H04L 67/1031
(Continued)

(56) References Cited

U.S. PATENT DOCUMENTS 7,082,455 B2 * 7/2006 Hu ......................... H04L 29/06
709/203
7,293,147 B2 11/2007 Tanaka
(Continued)

FOREIGN PATENT DOCUMENTS

CN 101272221 A2 9/2008
JP 08-255103 A 10/1996
(Continued)

OTHER PUBLICATIONS

"Office Action Received in Japanese Patent Application No. 2012-539922", Mailed Date: May 13, 2014, 6 Pages.
(Continued)

*Primary Examiner* — Wing F Chan
*Assistant Examiner* — Andrew Woo
(74) *Attorney, Agent, or Firm* — Ben Tabor; Kate Drakos; Micky Minhas (57) ABSTRACT

Cloud computing platforms having computer-readable media that perform methods for facilitating communications with storage. A request having a first-interface format to access storage is intercepted. The first interface format of the request supports access to a virtual hard drive (VHD). The request is translated to a blob request having a blob interface format. The blob interface format of the blob request supports access to a plurality of blobs of data in a blob store. The blob request is communicated to a blob interface such that the blob request is executed in managing the plurality of blobs.

20 Claims, 4 Drawing Sheets (52) U.S. Cl.
CPC .......... *G06F 3/0626* (2013.01); *G06F 3/0644* (2013.01); *G06F 3/0661* (2013.01); *G06F 3/0664* (2013.01)

(58) Field of Classification Search
USPC .................................................. 709/227, 229
See application file for complete search history.

(56) References Cited

U.S. PATENT DOCUMENTS

| | | | |
|---|---|---|---|
| 8,307,177 B2* | 11/2012 | Prahlad | G06F 11/1453 711/162 |
| 2005/0044140 A1 | 2/2005 | Urabe | |
| 2007/0198605 A1 | 8/2007 | Nobuyuki | |
| 2009/0144483 A1 | 6/2009 | Tatsuya | |
| 2009/0276771 A1* | 11/2009 | Nickolov | G06F 9/4856 717/177 |

FOREIGN PATENT DOCUMENTS

| | | |
|---|---|---|
| JP | 10-124437 A | 5/1998 |
| JP | 2003-256256 A1 | 9/2003 |
| JP | 2005-346426 A1 | 12/2005 |
| WO | 01/11486 A2 | 2/2001 |
| WO | 2009/111495 A1 | 9/2009 |

OTHER PUBLICATIONS

Matsuoka, Seiich, "Impact of Windows Azure, A Cloud Platform of Microsoft and Its Strategy", In ASCII dot Technologies, Japan, ASCII media works, vol. 14, Jul. 1, 2009, 8 Pages.

"Search Report Received in European Patent Application No. 10830499.9", Mailed Date: May 13, 2014, 10 Pages.

Hilley, David, "Cloud Computing: A Taxonomy of Platform and Infrastructure-level Offerings", In CERCS Technical Report, Apr. 30, 2009, 38 Pages.

Withoff, Olivier, "XenServer Storage Overview", Published on: Nov. 30, 2008, 16 pages. Available At: http://support.citrix.com/servlet/KbServlet/download/18670-102-671563/XenServe_Storage_Overview.pdf.

Search Report dated Mar. 12, 2014 in Chinese Patent Application No. 201080051695.6, 2 pages.

* cited by examiner

MANAGING VIRTUAL HARD DRIVES AS BLOBS

CROSS-REFERENCE TO RELATED APPLICATIONS

This application is a continuation of, and claims priority from, U.S. patent application Ser. No. 12/619,307, filed Nov. 16, 2009, entitled "MANAGING VIRTUAL HARD DRIVES AS BLOBS," which is incorporated herein by reference in its entirety.

BACKGROUND

Conventionally, cloud computing platforms host software applications in an Internet-accessible virtual environment. The cloud computing platform allows an organization to use datacenters designed and maintained by third parties. The conventional virtual environment supplies small or large organizations with requested hardware resources, software application resources, network resources, and storage resources. The virtual environment also provides application security, application reliability, application scalability, and availability.

The conventional datacenters provide the physical computing resources, physical storage resources, and physical network resources. The physical resources in the data center are virtualized and exposed to the organizations as a set of application programming interfaces. The organizations do not need to maintain their own hardware resources or software resources, or maintain datacenters that are reliable and scalable.

The organizations may access these physical resources efficiently through the virtual environment without knowing the details of the software or the underlying physical hardware.

SUMMARY

Embodiments of the invention relate, in one regard, to cloud computing platforms, computer-readable media, and computer-implemented methods that manage virtual hard drives in a cloud computing platform. The cloud computing platform includes fabric computers and blob stores that are used to access the virtual hard drives. The blob store is a durable cloud storage system that uses replication to keep several copies of each blob to ensure that the stored blobs are available and durable.

The fabric computers are configured to execute virtual machines that implement applications, which access virtual hard drives to read and write data via input/output (I/O) requests. The fabric computers include drive libraries, drivers, local caches, and interfaces to the blob store. The applications generate the I/O requests. In turn, the I/O requests are redirected to drivers that translate the I/O requests to blob commands. The drivers may complete the I/O requests with data stored in the local caches or the drivers may access the blob stores to obtain data stored in a blob associated with a virtual hard drive accessed by the I/O request. The blob commands are used to access the blob stores. The blob stores are configured to store blobs that are exposed as virtual hard drives to the applications. The application programming interfaces and semantics that enable access to the blobs are different from the application programming interfaces and semantics the application executes to access the virtual hard drives.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "blob" refers to a binary large object.

In some embodiments, applications running in the cloud computing platform access data in file systems stored in durable and available virtual hard drives. The data in the virtual hard drives remain available in the event of a software or hardware failure (e.g., drive failure, node failure, rack failure, bit rot, etc.). The applications may use application programming interfaces (APIs) and semantics, such as Windows® NTFS APIs, to access data stored in the virtual hard drives.

In one embodiment, the virtual hard drives are mountable block level virtual devices. The virtual hard drives allow the applications running on a virtual machine within the cloud computing platform to access data in the virtual hard drive using any file system API that interfaces with storage for the application. The virtual hard drives are durable and prevent loss of data for all writes by committing the writes to the blob store. The virtual hard drives are blobs. The content of the virtual hard drives and metadata associated with the virtual hard drives are stored in the blobs. The blobs may be uploaded from, or downloaded to, the blob store via a blob interface. Additionally, the blob interface may allow the applications to mount a virtual hard drive associated with the blob and access the data stored in the virtual hard drive.

The virtual hard drive, in some embodiments, is mounted as a volume by the applications. Application I/O requests are redirected to blobs stored in the blob store. In one embodiment, writes to a blob are made durable by storing the written data in the blob store, which acknowledges successful writes to the applications after the writes are made durable in the blob store. When the virtual hard drive is unmounted or the virtual machine that mounted the drives fails, the blob associated with the virtual hard drives persists in the durable blob store. Accordingly, another virtual machine may mount the same blob associated with the virtual hard drive and access the data stored in the blob.

The cloud computing platform enables, among other things, migration and execution of legacy applications, including relational databases, that may use storage resources; survival of data on the virtual machine during failure or shutdown; memorial of data for use by other virtual machines; and concurrent data sharing among many virtual machines. The migration and execution of legacy applications allow the virtual machine to execute applications that are configured to initiate I/O requests via the Windows® NTFS file system. The virtual machines also execute relational databases that use structured query language (SQL), such as mySQL, or Oracle without having to perform additional database minoring. A virtual machine stores data to the virtual hard drives, and the data stored in the virtual hard drive is available to the additional virtual machine if the current virtual machine fails. Snapshots memorialize the current state of a blob associated with a virtual hard drive. A snapshot may be used to create read only virtual hard drives that are accessible by the virtual machine. The data stored in the virtual hard drives may be available to many virtual machines concurrently. In one embodiment, the cloud computing platform updates the virtual hard drive, creates a snapshot, and then shares the snapshot to other virtual machines.

In one embodiment, the cloud computing platform may expose physical machines as virtual machines. The physical machines may be accessed via commands used by the virtual machines.

As one skilled in the art will appreciate, the cloud computing platform may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory technologies can store data momentarily, temporarily, or permanently.

In one embodiment, the cloud computing platform includes cloud applications that are available to client devices. The client devices access the cloud computing platform to execute the cloud applications. The cloud applications are implemented using storage and processing resources available in the cloud computing platform.

Figure 1:
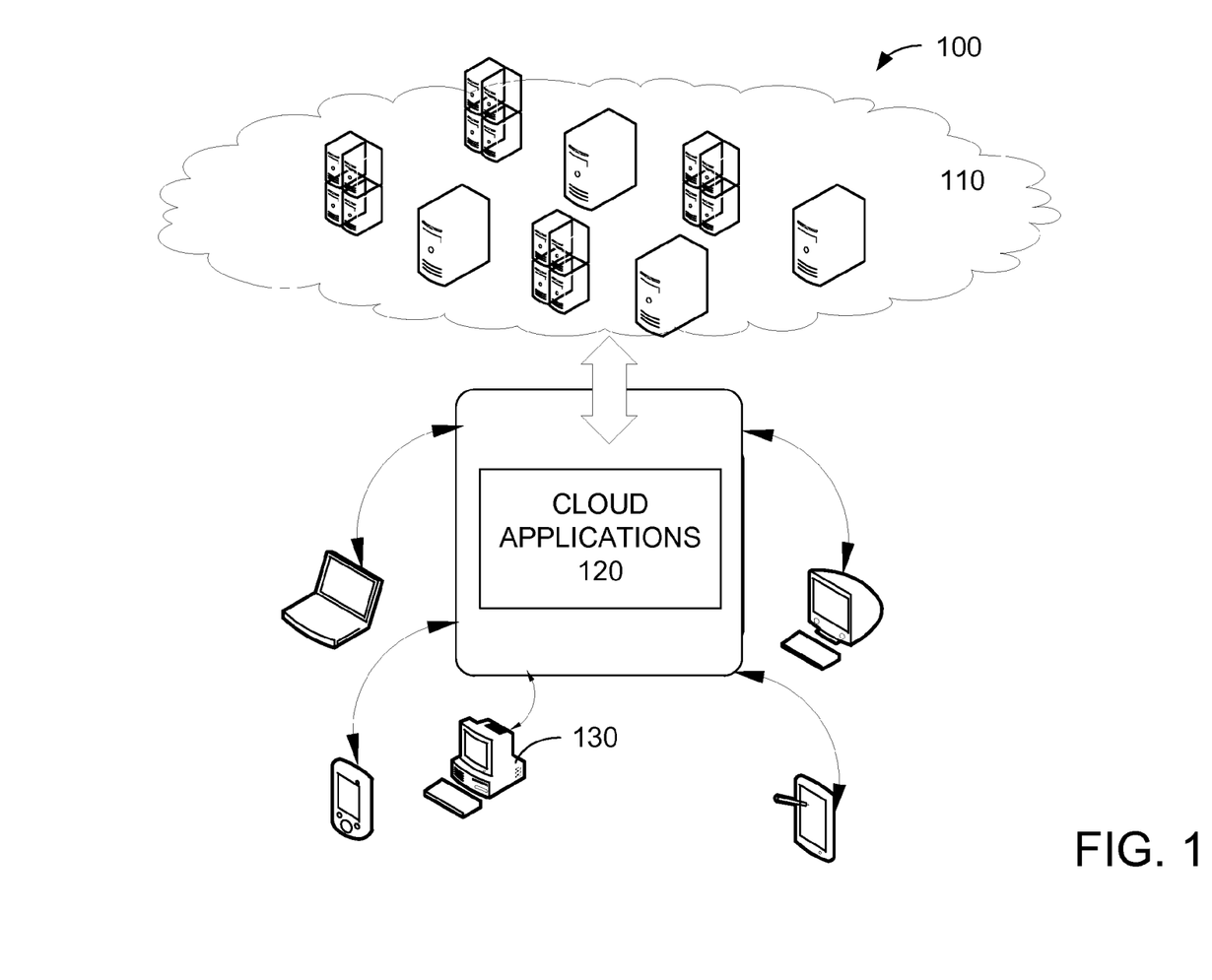
FIG. 1 is a network diagram that illustrates an exemplary cloud computing platform in accordance with embodiments of the invention.

FIG. 1 is a network diagram that illustrates an exemplary computing system 100 in accordance with embodiments of the invention. The computing system 100 shown in FIG. 1 is merely exemplary and is not intended to suggest any limitation as to scope or functionality. Embodiments of the invention are operable with numerous other configurations. With reference to FIG. 1, the computing system 100 includes a cloud computing platform 110, cloud applications 120, and client devices 130.

The cloud computing platform 110 is configured to execute cloud applications 120 requested by the client devices 130. The cloud computing platform 110 maintains a blob store. The blob store provide blobs that store data accessed by cloud applications 120. The cloud computing platform 110 connects to the client devices 130 via a communications network, such as a wireless network, local area network, wired network, or the Internet.

The cloud applications 120 are available to the client devices 130. The software executed on the cloud computing platform 110 implements the cloud applications 120. In one embodiment, virtual machines in the cloud computing platform 110 execute the cloud applications 120. The cloud applications 120 may include editing applications, network management applications, finance applications, or any application requested or developed by the client devices 130. In certain embodiments, some functionality of the cloud application 130 may be executed on the client devices 130.

The client devices 130 are utilized by a user to interact with cloud applications 120 provided by the cloud computing platform 110. The client devices 130, in some embodiments, must register with the cloud computing platform 110 to access the cloud applications 120. Any client device 130 with an account from the cloud computing platform 110 may access the cloud applications 120 and other resources provided in the cloud computing platform 110. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the cloud computing platform 110 to receive results from the cloud applications 120.

Accordingly, the computing system 100 is configured with a cloud computing platform 110 that provides cloud applications 120 to the client devices 130. The cloud applications 120 remove the burden of updating and managing multiple local client applications on the client devices 130.

In certain embodiments, the cloud computing platform provides fabric computers and blob stores. The fabric computers execute cloud applications in one or more virtual machines. The blob store stores data use by the cloud applications. In turn, the cloud applications interface with the blobs as virtual hard drives via a driver that translates cloud application I/O requests to blob commands.

Figure 2:
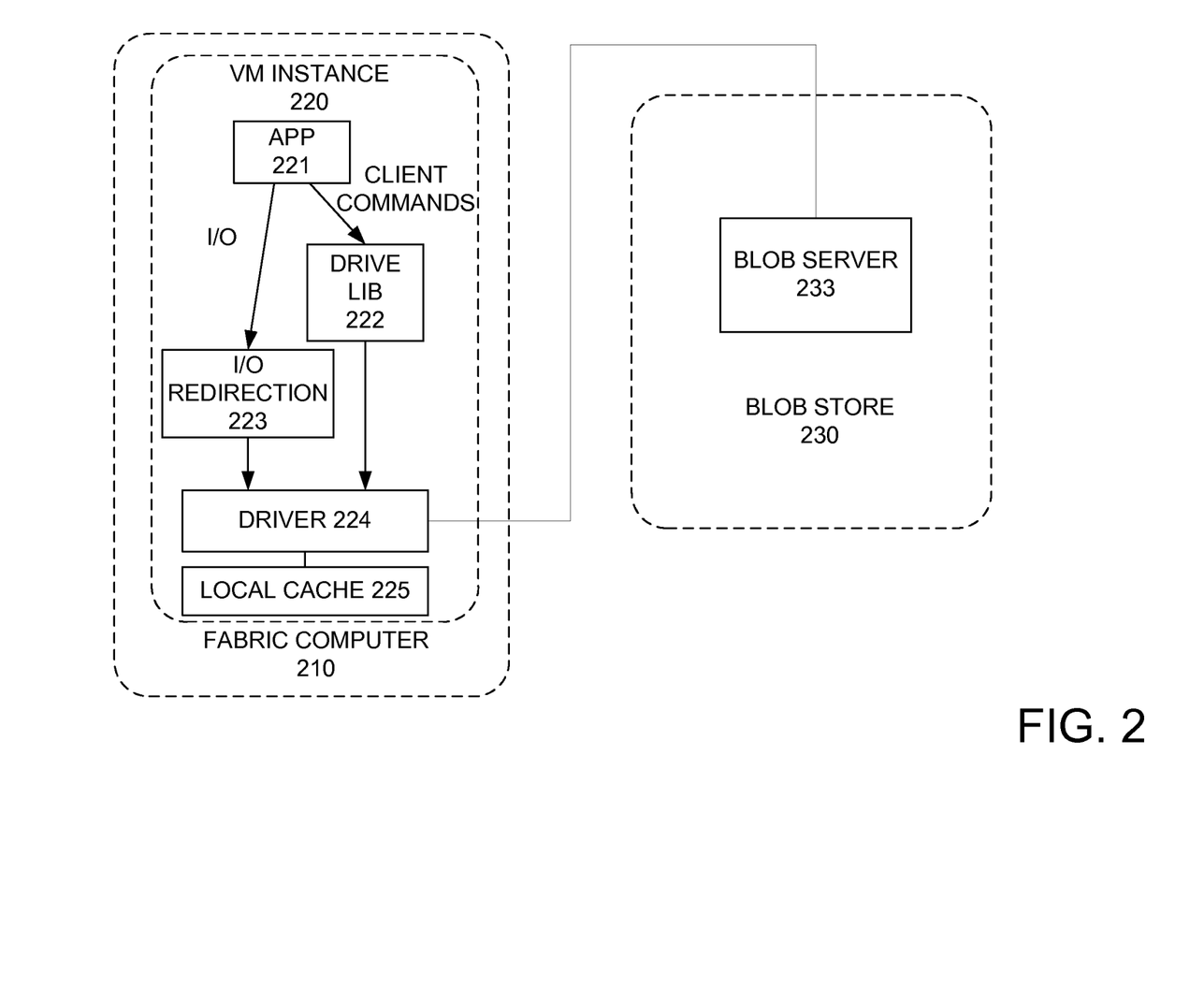
FIG. 2 is a block diagram that illustrates an exemplary fabric computer and an exemplary blob store in the exemplary cloud computing platform.

FIG. 2 is a block diagram that illustrates an exemplary fabric computer 210 and an exemplary blob store 230 in the exemplary cloud computing platform. The fabric computer 210 executes a virtual machine 220 that implements cloud application 221. The blob store 230 is accessible by the fabric computer 210 via an Internet protocol (IP) address. In one embodiment, the cloud application 221 may be executed by the fabric computer 210, which in turn accesses the blob store to obtain a blob that implements a virtual hard drive used by the cloud application 221.

The virtual machine 220 includes a drive library 222, I/O redirection 223, a driver 224, and local cache 225. The drive library 222 may provide drive management, and the I/O redirection 223 may enables access to the content stored in the virtual hard drive by redirecting drive commands to driver 224, which translates the drive commands to blob commands. In one embodiment, the virtual machine 220 may access data in a blob corresponding to a virtual hard drive (VHD) using drive commands, such as, CreateDrive, DeleteDrive, ListDrive, MountDrive, UnmountDrive, and SnapshotDrive stored in the drive library 222. In one embodiment, the drive library 222 may provide the virtual machine 220 with a blob namespace to locate the drive commands. For instance, the virtual machine 220 may locate the blob namespace by accessing a uniform resource locator, e.g., http://<accountname>.blob.core.windows.net/containername>/<kblobname>, in the drive library 222, where accountname is a name of the account registered by a user of the cloud computing platform, containername is the name of the blob store, and blobname is the name of the blob.

In turn, the virtual machine 220 may issue I/O requests to the VHD. The I/O requests are translated by the driver 224 to blob commands. The blobs in the blob store 230 may be exposed as virtual hard drives (VHDs) to the cloud application 221 executing on the virtual machine 220. In one embodiment, the VHD may be a special type of blob (e.g., page blob), which can be mounted by the cloud application 221 with a time-limited lease. The VHD may be accessed by any cloud application 221 using file system semantics, e.g., Windows® NTFS semantics or drive commands contained in drive library 222.

The I/O request issued to the VHD is received by I/O redirection 223. I/O redirection 223 is a component configured to forward the cloud application I/O requests destined for a VHD to the driver 224.

In certain embodiments, the driver 224 provides and/or implements an interface used by the cloud application to translate drive commands received, from the cloud application, to blob commands, such as, LeaseBlob, SnapShotBlob, PutPage, ClearPage, GetBlob, etc. The driver 224 also translates cloud application I/O requests destined to the mounted virtual hard drive to blob commands that are transmitted to, and processed by, the blob store 230. The driver 224 may manage a local cache 225 for the virtual hard drive to store data that is stored in the blob corresponding to the virtual hard drive. The driver 224 may use the local cache 225 to retrieve data corresponding to read operations from the cloud application 221. The write operations from the cloud application 221 may be transmitted to both the local cache 225 and the blob in the blob store 230. In other embodiments, the driver 224 may manage leases corresponding to virtual hard drives to prevent a cloud application from accessing data in the local cache 225 or in the blob store when a lease is expired.

Each local cache 225 is associated with a single VHD. The local cache 225 for a mounted VHD may be located on the same fabric computer 210 or the local cache 225 may be located on a computing resource within the same rack of the fabric computer 210 that mounted the VHD. This configuration may save network bandwidth. In some embodiments, the virtual machine 220 may request multiple VHDs. For each VHD, the virtual machine may specify the amount of disk drive space on the fabric computer to use as the local cache 225. The data stored in the local cache 225 may be cyclic redundancy checked (CRC'ed) to prevent the virtual machine 220 from using data that contains errors.

In certain embodiments, the local cache 225 is synchronized with a corresponding blob of the VHD. The driver 224 may manage the local cache 225. The driver 224 may be configured to hold off writing to the local cache 225 until an acknowledgement is received from the blob in the blob store 230. Alternatively, the driver 224 may write both to the local cache 225 and to the blob store 230 in parallel. If the virtual machine 220 crashes and resets while writing in parallel to the blob store 230, the virtual machine 220 may try to remount the virtual hard drive and reuse the corresponding local cache 225. The virtual machine 220 may check the local cache 225 to determine which data blocks were speculatively written to the local cache 225 without an acknowledgement from the blob store 230. In turn, the virtual machine 220 may flush the local cache 225 of the unacknowledged data blocks. In other embodiments, the virtual machine 220 may flush the entire local cache 225 or a selected portion of the local cache 225. The local cache 225 stores the data frequently used by the virtual machine 220 on the fabric computer 210. The local cache 225 reduces the number of reads requested from the blob store 230, which saves network bandwidth and reduces network contention. Additionally, the virtual machine 220 may experience performance improvements due to the reduced latency obtained by retrieving data reads from the local cache 225. In some embodiments, a virtual machine experiencing high connectivity (e.g., 10 Gbps) to the blob store 230 may not use the local cache 225.

The blob store 230 is connected to fabric computer 210. The fabric computer 210 accesses the blob store 230 through an IP address. The blob store 230 includes blob servers 233. The blob servers 233 interface with the fabric computer 210, control access to blobs, and implement the blob commands on the blobs. The blob server 233 is part of a replicated blob storage system, where the stored blobs are replicated across several servers to create copies of the blob that are maintained separately in case there is a drive, node, or rack failure. This ensures that the blobs are available and durable in the face of failures.

The blob commands received from the driver 224, or a cloud application 221, when accessing the blob, include LeaseBlob, SnapshotBlob, PutPage, ClearPage, and GetBlob.

The LeaseBlob command causes the blob store 230 to create a lease for a blob stored on the blob store 230. In some embodiments, the lease is an exclusive write lease, which allows only one cloud application 221 to write to the blob. When obtaining an exclusive write lease, a lease identifier (ID) is created by the blob server 233 and returned to the cloud application 221. The driver 224 stores the lease ID and includes the lease ID with any writes that are transmitted to the blob store 230. The LeaseBlob command also supports exclusive read-write leases and other types of leases. In some embodiments, the LeaseBlob command allows the driver 224 to specify the duration of the lease. The LeaseBlob command may be used by the driver 224 to renew the lease or terminate the lease.

The SnapshotBlob command causes the blob store to create a snapshot of the data in the blob. The snapshot is read only. The driver 224 may use this command to enable concurrent access to the contents of a blob. One or more snapshots of the same blob may be concurrently accessed by two or more cloud applications. The snapshots may provide versioning for the blob. The snapshots for a blob are accessed based on the name of the blob and a version timestamp that is auto-created (in case of multiple versions) by the blob server 233. In other words, when a blob is updated snapshots created before and after the blob update contain different version timestamps. In certain embodiments, the cloud application may cause the driver 224 to send metadata to the blob store for a snapshot. The metadata may be used to describe the snapshot or to quickly locate the snapshot.

The PutPage command causes the blob server 233 to store a range of pages at a specified address in the blob store 230. Each page may consist of a range of memory blocks in the primary storage device. The PutPage command may be used by the driver 224 to write data to the blob store. An offset may be specified to allow storage within any valid address in the blob store 230. The pages do not have to be written in order and there may be gaps (e.g., empty blocks) in the address space of the blob. For instance, the driver 224 may put a 4 KB page at offset 0, and another one at offset 4 KB*1 million in the blob store 230. The blob store 230 may store those 2 pages at the specified addresses. These pages are committed to the blob store 230 after a successful PutPage command. In turn, the blob store 230 acknowledges success to the driver 224. The PutPage command causes the blob server 233 to check the lease ID before updating the blob. When an exclusive write lease is specified for a blob, the PutPage command is successful when an valid lease ID is specified by the driver while requesting the update to the blob. When a lease expires, a PutPage command will be unsuccessful and the blob server 233 may remove the expired lease ID.

The ClearPage command causes the blob server 233 to clear a specific page or range of pages from the blob store 230. The driver 224 transmits a ClearPage command to remove pages from the blob in response to a cloud application 221 request to delete data from the virtual hard drive. The ClearPage command causes the blob server 233 to ensure a valid lease ID is specified for the blob associated with the VHD before removing the pages having the data that is the subject of the delete request. When a lease expires, a ClearPage command will be unsuccessful and the blob server 233 may clear the expired lease ID.

The GetBlob command causes the blob server 233 to retrieve a whole blob or a range of pages (e.g., bytes) for a specified blob. The driver 224 transmits the GetBlob command in response to a cloud application 221 request to obtain data from the Virtual Hard Drive. The GetBlob command causes the blob server 233 to ensure a valid lease ID is specified for the blob associated with the VHD before obtaining the pages. When a lease expires, a GetBlob command will be unsuccessful and the blob server 233 may clear the expired lease ID.

The driver 224 receives drive commands and I/O requests from the cloud application 221. In turn, the driver 224 translates the cloud commands and I/O requests to blob commands. The drive commands are used by the cloud application to manage the VHD and the I/O requests are used to access the data stored in the VHD. The drive commands include, among others, CreateDrive, MountDrive, UnMountDrive, DeleteDrive, ListDrive, and SnapshotDrive The CreateDrive command is used by the cloud application 221 to create the virtual hard drive. The cloud application 221 specifies the size and the format for the virtual hard drive. For instance, the cloud application 221 may format the virtual hard drive as a single partition single volume using the Windows® NTFS file system. In turn, the driver 224 translates the drive command to appropriate blob commands that are available in the blob namespace. The driver may then transmit, to the blob store 230, the blob commands, e.g. PutPage, LeaseBlob, etc., which create a blob for the VHD.

The MountDrive command is used by the cloud application 221 to mount the VHD. When mounting a VHD, the cloud application 221 may specify the amount of local disk space to use as the local cache 225 for the mounted VHD. The cloud application 221 may also request an exclusive write VHD, write VHD, shared read only VHD, etc. The exclusive write VHD means only the cloud application 221 may update the VHD. The write VHD means the cloud application 221 may update the VHD and that other cloud applications may update the VHD in turn. The shared read only VHD means that the VHD is read only, and other virtual machines 220 may concurrently read from the same VHD. The driver 224 may prevent writing to a read only VHD because a lease ID may not be associated with the corresponding blob of the VHD. In turn, the driver 224 translates the MountDrive command to the appropriate blob commands. For instance, the driver 224 may transmit, to the blob store 230, the LeaseBlob command to get and maintain a lease on a blob corresponding to the VHD. Additionally, the driver may routinely renew the lease on the blob to continue providing the cloud application 221 with access to the VHD. If the lease is not renewed, the cloud application write requests 221 may be unsuccessful.

The UnmountDrive command is used by the cloud application 221 to unmount the specified VHD. The UnmountDrive command may cause the driver 224 to terminate the lease for the blob associated with the specified VHD. When the fabric computer 210 or virtual machine 220 fails, the driver 224 may automatically issue the UnmountDrive command to terminate any leases for blobs used by the fabric computer 210 or virtual machine 220.

The DeleteDrive command is used by the cloud application 221 to delete the specified VHD. The DeleteDrive command may cause the driver 224 to transmit a blob command that terminates the lease for the blob associated with the specified VHD. In some embodiments, the driver 224 may transmit a ClearPage command to remove all pages for the blob associated with the specified VHD. After deleting the VHD, the data in the blob is not available to the cloud computing platform or cloud application 221.

The ListDrive command is used by the cloud application 221 to list all VHDs associated with the cloud application 221. The ListDrive command may cause the driver 224 to locate each lease ID associated with a cloud application 221. In some embodiments, the driver 224 may transmit, to the cloud application 221, a letter or numeral corresponding to each lease ID available to the cloud application 221. The driver 224 may also receive numerals or letters associated with snapshots or other drives without lease IDs.

The SnapshotDrive command is used by the cloud application 221 to obtain snapshots of each VHD associated with the cloud application 221. The SnapshotDrive command may cause the driver 224 to locate a blob associated with the VHD and transmit a SnapshotBlob command to the blob store. In turn, the driver 224 may return a letter, numeral, or timestamp, e.g., date and time, of the snapshot to the cloud application 221. The snapshot of the blob may be accessed as a VHD by the cloud application 221.

In certain embodiments, the I/O requests from the cloud application 221 are processed by the driver 224. The VHD mounted by the cloud application 221 is accessed to perform the I/O requests on the stored data. The I/O request may include, among other things, read and write requests.

For instance, the VHD may receive read requests from the cloud application 221. The I/O redirection 223 may route the read requests to the driver 224. In turn, the driver 221 may order the read requests with any overlapping prior write requests received from the cloud application 221. This ensures that the read will return the pending updates, only after the write requests are stored in the blob store 230. The driver 224 checks a buffer of recently written data for the requested data. If the buffer does not contain the requested data, the local cache 225 is checked. When the data is available in the local cache 225 and read from the local cache 225, the CRC for the block is checked to ensure the integrity of the data. If there is a CRC mismatch, then the data is removed from the cache, and it is retrieved from the blob store 230.

If the data is not found in the local cache 225, the driver 224 reads the data from the blob store 230. To read the data from the blob store 230, the driver 224 transmits a GetBlob command to access a page corresponding with the requested data. In certain embodiments, reading data from the blob store 230 is conditioned on having a valid lease ID. After the data is read and validated, the data is returned to the cloud application 221. When the data is retrieved from the blob store 230, the driver 224 determines whether to cache the data based on the size of the local cache 225, cache replacement policies, etc. If the data is to be stored in the local cache 225, the data is stored and a CRC code is calculated and stored. The CRC can be stored with the data, or may be written later to a different location on the fabric computer 210.

The cloud application 221 writes data to the VHD. The I/O redirection may route write requests to the driver 224. In turn, the driver 224 may order the incoming I/O requests with respect to the pending read and write requests. The driver 224 transmits the write request to the blob store 230. In one embodiment, the driver 224 orders all overlapping write requests to the blob store, and only transmits nonoverlapping write requests in parallel to the blob store 230. When there are pending overlapping read or write requests, an incoming write request will be ordered and have to wait until the overlapping I/O requests are transmitted to blob store 230 and acknowledged.

After the overlapping requests are ordered, the incoming write is transmitted to the blob store 230. The write is conditional based upon a valid lease ID for a blob corresponding to the mounted VHD. If the lease has expired, the write request fails. In this case, the driver 224 may try to reacquire the lease; if it cannot the write still fails. When a write request is successful, it is made durable by storing the write request in the blob store 230 and replicating the write before acknowledging the success back to the cloud application 221.

If a write request timed out (e.g., no acknowledgement was received from the blob store 230) then the driver 224 retries the write request. The driver 224 may also retry the write request when the blob store transmits a "timeout" or "server busy." The driver 224 returns success once the retry succeeds at the blob store 230. In another embodiment, the driver ensures that a stale write (e.g., an unacknowledged write request transmitted to the blob store 230) does not duplicate a subsequent retry. The stale writes may be discarded by waiting to obtain a blob server timeout message or waiting for the blob server timeout period. Accordingly, before performing an overlapping write request to the write retry range, the driver 224 ensures that stale writes are flushed through the system by waiting for their blob server timeout period to pass. The blob server 233 discards the stale writes after a given amount of time has passed. Alternatively, the driver 224 may reset the lease or a sequence number associated with the blob. A change in lease ID may prevent a stale write with an expired lease ID from updating the blob store 230. Optionally, the sequence numbers associated with the blob may increment after each successful write request. When the driver 224 does not obtain an acknowledgement from the blob store 230, the driver 224 increases the sequence numbers to inform the blob store 230 that any earlier writes with an earlier sequence number should be discarded. Accordingly, the blob store 230 ignores all stale writes, and all future writes from the driver 224 uses the new lease ID or sequence number.

The blob server 233 stores a sequence number for the blob in the blob store 230. The sequence number is used by the blob server 233 to deny access to the blob when the blob server receives stale writes. When using the sequence number, every PagePut or PageClear command passes in a sequence number, and the sequence number included in the command is checked to determine whether it is greater than or equal to the sequence number stored with the blob in the blob store. The command may be successful when the sequence number included in the command is greater than or equal to the sequence number stored with the blob in the blob store. Otherwise, the command fails.

In one embodiment, when mounting a VHD the sequence number for the corresponding blob is set to 0. All writes to the VHD and its corresponding blob pass in sequence number 0. In turn, the blob server 233 accepts the write since the passed in sequence number matches the one stored for the blob. If one of the writes timeout, the driver 224 does not know if the write is sitting in a queue waiting to execute. After a timeout periods, e.g. 10 seconds, the driver 224 sends a request to the blob server 233 to increment the sequence number associated with blob having the outstanding write. The blob server 233 increments the blob's sequence number to 1. Thereafter, the driver 224 transmits writes for the VHD with a sequence number of 1 to the blob server 233, which successfully implements the received writes in the blob. If a stale write with a sequence number of 0 arrives at the blob server 233 after the sequence numbers are updated, the blob server 233 discards the write since the passed in sequence number is less than the one stored for the blob.

In one embodiment, the cloud computing platform executes cloud applications that create VHDs. The VHDs store data that is used by the cloud applications. In turn, a blob store representing the VHD is managed by a driver to interpret the native cloud application commands and I/O requests as blob commands for the blob corresponding to the VHD.

Figure 3:
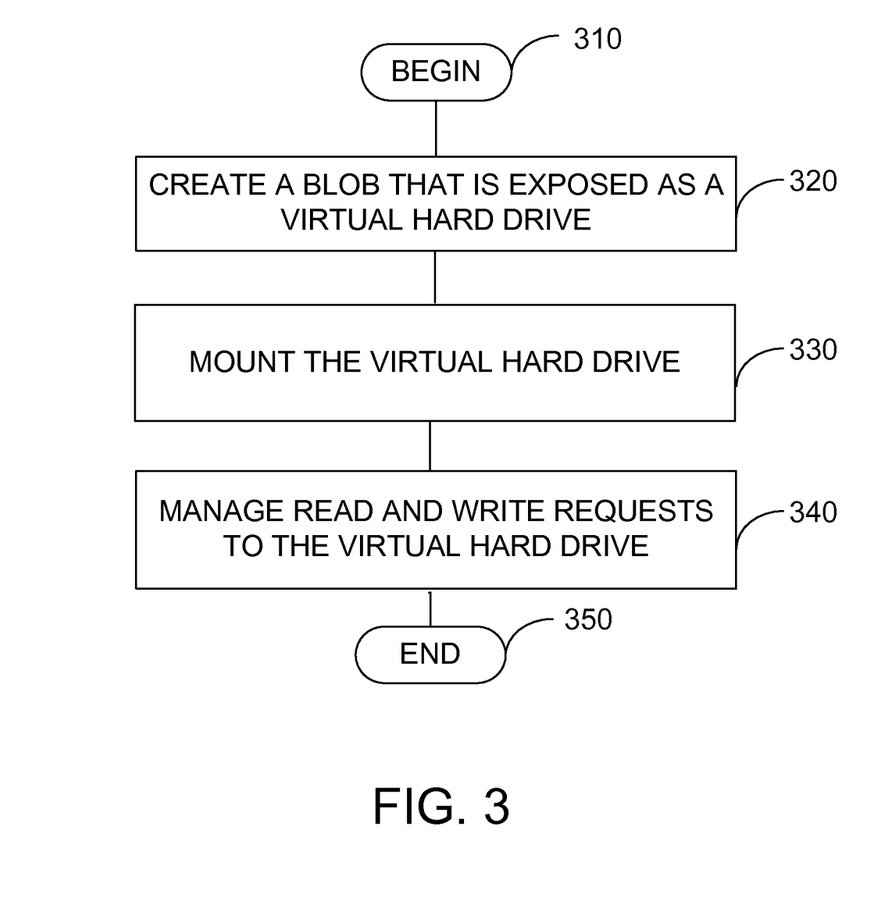
FIG. 3 is a logic diagram that illustrates an exemplary method to create a blob that is exposed as a virtual hard drive.

FIG. 3 is a logic diagram that illustrates an exemplary method to create a blob that is exposed as a virtual hard drive (VHD). The method initializes in step 310. The cloud computing platform creates a blob in a blob store that is exposed as a VHD, in step 320. In one embodiment, the cloud computing platform may format the VHD as one of an N-T-F-S file system or an F-A-T file system. In turn, the VHD is mounted by one or more applications executing on a virtual machine in the cloud computing platform, in step 330. In step 340, a driver manages read and write requests to the VHD. The driver intercepts all I/O to the VHD and reroutes the I/O to the blob in the blob store. The writes in the I/O requests are committed to the blob store before acknowledging success back to the application. Exclusive write access may be provided to the blob for a cloud application via a blob lease that expires after a specified time period. The driver may execute a thread that continuously renews the lease so the VHD can stay mounted for as long as the application is running and wants to use it. In another embodiment, the lease may be renewed each time there is a successful update to the blob. In turn, the cloud application conditionally writes to the blob based on the validity of the lease while other cloud applications are allowed to read from the blob.

The blobs are accessed and manipulated via a blob interface available to the driver. A snapshot of the blob may be created via the blob interface to allow additional applications to concurrently read data stored in the blob. In certain embodiments, the blobs may also be uploaded, downloaded, or debugged via a blob interface available to some cloud applications executed by the cloud computing platform. The cloud application may execute a debugger to check for consistent storage of data. The method terminates in step 350.

In some embodiments, the driver manages the I/O requests for the cloud application. The driver translates the I/O requests destined for a VHD to appropriate blob commands that are transmitted to a corresponding blob in the blob store. In turn, the blob store accesses the blob to implement the blob command.

Figure 4:
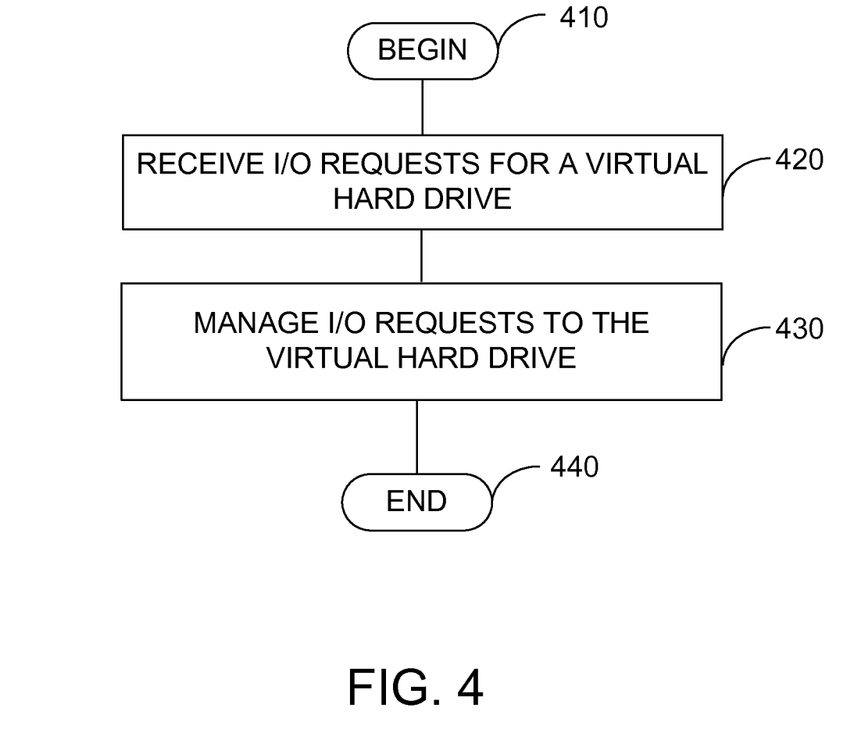
FIG. 4 is a logic diagram that illustrates an exemplary method to manage I/O requests to a virtual hard drive.

FIG. 4 is a logic diagram that illustrates an exemplary method to manage I/O requests to a virtual hard drive. The method initializes in step 410. In step 420, I/O requests are received for a VHD from a cloud application executing on a virtual machine in the cloud computing platform. In one embodiment, the driver associates a sequence number with the I/O request to prevent overwriting prior write requests with recent write requests to the same data. The sequence number also prevents stale writes from overwriting recent write requests. In some embodiments, the driver may increase the sequence number for the blob and the sequence numbers passed in with the blob command to ignore a prior write request having an older sequence, where the prior write request was not acknowledged by the blob store. In step 430, a driver manages the I/O requests to the VHD. The driver orders all overlapping I/O requests to the blob in the blob store and transmits nonoverlapping I/O requests in parallel to the blobs corresponding to the VHD in the blob store. In another embodiment, a local cache on the virtual machine is updated by the driver with a write request, where the update to the local cache occurs either after an acknowledgement is received from the blob store, or in parallel with an update to the blob store. But the update in the local cache is available only after acknowledgement is received from the blob store. All or part of the local cache may be flushed by the driver after cloud application failure or virtual machine failure, when the cache and blob are inconsistent upon restarting the cloud application or virtual machine. The method terminates in step 440.

In summary, the cloud computing platform provides VHDs using the blobs in the blob store. For instance, a database application may be executed on the cloud computing platform. In the database application, the log is written in a sequential manner. The log is used for a fairly large number of writes, e.g., redo/undo records, BTree change records, and commit records. The dedicated "log drive" prevents contention between log access and data access. The dedicated "database drive" is used to access (write and read) data in the database. The proportion of "log drive" reads is very small and the database drive has a high proportion of both reads and writes.

The database application executing the cloud computing platform may create two VHDs: a "log drive" and a "database drive." In turn, the blob store creates two blobs that correspond to the "log drive" and "database drive," respectively. The database application mounts the "log drive" and sets no caching because the majority of log traffic is log writes. In turn, cloud application mounts the "database drive," and sets 100% caching allowing most of the read requests to be served by the local cache.

The foregoing descriptions of the embodiments of the invention are illustrative, and modifications in configuration and implementation are within the scope of the current description. For instance, while the embodiments of the invention are generally described with relation to FIGS. 1-4, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

What is claimed is:

1. A method for facilitating communications with storage, the method comprising:
   intercepting a request having a first-interface format, the request is received from an application running on a virtual machine, the application communicates using the first-interface format, wherein the first-interface format of the request supports access to a virtual hard drive (VHD), wherein the VHD is mounted as a block device associated with a blob interface and a blob store;
   translating the request to a blob request having a blob interface format, wherein the blob interface format of the blob request supports access to a plurality of blobs of data in the blob store; and
   communicating the blob request to the blob interface associated with the VHD such that the blob request is executed in managing the plurality of blobs.

2. The method of claim 1, wherein the request is generated to function with an application programming interface (API) for communicating with the VHD.

3. The method of claim 2, wherein the API is a legacy interface for communicating with the VHD.

4. The method of claim 2, wherein the request is an input/output (I/O) request.

5. The method of claim 1, wherein the plurality of blobs are accessible both directly through the blob interface and through a VHD-redirect to the blob interface when the VHD is mounted by the application.

6. The method of claim 1, wherein the VHD is mounted for access to the plurality of blobs based on a time-limited lease associated with the application.

7. The method of claim 6, wherein the time-limited lease is renewable for the application maintain access to the plurality of blobs.

8. The method of claim 1, wherein the request is generated at a client device running the application via a cloud computing platform.

9. The method of claim 8, wherein the client device includes storage information comprising configuration settings that facilitate access to the blob server.

10. A system for facilitating communications with storage, the system comprising:
- a processor and a memory configured for providing computer program instructions to the processor;
- an application configured for:
- generating a request, from an application running on one or more virtual machines, directed to a virtual hard drive (VHD), the request having a first-interface format, wherein the first-interface format of the request supports access to the VHD, wherein the VHD is mounted as a block device associated with a blob interface and a blob store;
- a driver configured for:
- intercepting the request from the application running on the one or more virtual machines;
- translating the request to a blob request having a blob interface format, wherein the blob interface format of the blob request supports access to the plurality of blobs of data in the blob store; and
- communicating the blob request to the blob interface such that the blob request is executed in managing the plurality of blobs.

11. The system of claim 10, further comprising:
- the blob server configured for:
- storing the plurality of blobs in the blob store that are exposed via the VHD to the application; and
- receiving via the blob interface the request for access to the plurality of blobs, wherein the request is communicated as a blob request upon translation by the driver.

12. The system of claim 11, wherein the blob server further comprises one or more snapshots of the plurality of blobs, wherein the one or more snapshots are created via the blob interface to allow additional applications to concurrently read data stored in the plurality of blobs.

13. The system of claim 10, further comprising:
- an input/output (I/O) redirection component configured for:
- redirecting the request from the VHD to the driver.

14. The system of claim 10, wherein the driver is further configured for:
- translating the request to the blob request, wherein translating the blob request comprises:
- accessing a drive library to locate drive commands;
- identifying a drive command that interprets the request; and
- converting the request based on the drive command to the blob request;
- communicating the blob request to the blob interface wherein communicating the blob request comprises locating a blob on the server;
- transmitting the blob request through the blob interface to the blob store on the blob server; and
- reporting information associated with the blob request to the application.

15. The system of claim 10, wherein the driver is further configured for managing a plurality of time-leases associated with the VHD, wherein the plurality of time-leases are renewable.

16. One or more hardware computer storage media storing computer-useable instructions that, when used by one or more computing devices, cause the one or more computing devices to perform a method for facilitating communications with storage, the method comprising:
- intercepting a request having a first-interface format that is different from a blob interface format, wherein the first-interface format of the request supports access to a virtual hard drive (VHD), wherein the request is directed to the VHD, the VHD is mounted as a block device associated with a blob interface and a blob store;
- translating the request to a blob request having a blob interface format, wherein the blob interface format of the blob request supports access to a plurality of blobs that store data in a blob store; and
- communicating the blob request to the blob interface associated with the VHD such that the blob request is executed in managing the plurality blobs.

17. The media of claim 16, wherein translating the request comprises:
- accessing a drive library to locate drive commands;
- identifying a drive command that interprets the request; and
- converting the request based on the drive command to the blob request.

18. The media of claim 16, wherein communicating the blob request to the blob interface further comprises:
- locating a blob on the blob server;
- transmitting the blob request through the blob interface to the blob store on the blob server; and
- reporting information associated with the blob request to the application.

19. The media of claim 16, wherein managing the plurality of blobs comprises reading and writing data records on the blob server.

20. The media of claim 16, wherein a snapshot of the plurality of blobs is created via the blob interface to allow additional applications to concurrently read data stored in the plurality of blobs.

* * * * *